United States Patent [19]
Dudley et al.

[11] Patent Number: 5,503,497
[45] Date of Patent: Apr. 2, 1996

[54] RATCHET LINK

[75] Inventors: James P. Dudley, Sacramento; Kyle D. Fields, El Dorado Hills; Timothy J. Landis, Loomis, all of Calif.

[73] Assignee: OP-D-OP, Inc., Roseville, Calif.

[21] Appl. No.: 308,608

[22] Filed: Sep. 19, 1994

[51] Int. Cl.⁶ .................................................. A63H 33/08
[52] U.S. Cl. .................. 403/103; 403/354; 403/361; 403/364; 446/104; 446/111; 446/120; 446/125
[58] Field of Search ..................................... 446/125, 120, 446/104, 102, 111; 403/103, 354, 361, 364

[56] References Cited

U.S. PATENT DOCUMENTS

| | | |
|---|---|---|
| 1,678,709 | 7/1928 | Schurmann . |
| 2,388,297 | 11/1945 | Slaughter . |
| 2,990,640 | 7/1961 | Burnbaum ..................... 446/120 X |
| 3,000,049 | 9/1961 | Terry, Jr. . |
| 3,118,167 | 1/1964 | Morris et al. . |
| 3,477,167 | 11/1969 | Ach ..................... 446/120 X |
| 3,550,311 | 12/1970 | Fouquart ..................... 446/120 X |
| 4,071,244 | 1/1978 | Richards ..................... 446/120 X |
| 4,352,255 | 10/1982 | Warehime ..................... 446/102 X |
| 4,506,408 | 3/1985 | Brown . |
| 4,548,590 | 10/1985 | Green ..................... 446/120 |
| 4,617,001 | 10/1986 | Parein ..................... 446/102 |
| 4,738,648 | 4/1988 | Berndt ..................... 446/120 |
| 5,049,104 | 9/1991 | Olsen ..................... 446/104 |
| 5,172,534 | 12/1992 | Milner et al. ..................... 446/104 X |
| 5,209,693 | 5/1993 | Lyman ..................... 446/104 |
| 5,427,559 | 6/1995 | Glickman et al. ..................... 446/104 X |

*Primary Examiner*—Terry Lee Melius
*Assistant Examiner*—Christopher J. Novosad
*Attorney, Agent, or Firm*—John P. O'Banion

[57] ABSTRACT

A ratchet link having a cylindrically-shaped tongue at one end and a C-shaped socket at the other end for use in an articulating coupling system. The socket is defined by a pair of opposing, spaced-apart, resilient arcuate prongs which extend outward from the device away from the tongue end. The inside radius of the socket is substantially the same as the outside radius of the tongue, so that the tongue can be inserted into the socket of another link. The socket includes a narrow centrally positioned slot along its circumference, and the tongue includes a narrow centrally positioned ring extending outward along its circumference which is received by the slot when the tongue is inserted into the socket. A plurality of spaced apart teeth are provided along the inside surface of the socket and extend between the faces of the device in a substantially perpendicular orientation to the plane of the faces. Similar teeth are located along the outside surface of the tongue. When the tongue of one link is placed into the socket of another link, the teeth intermesh wherein the teeth in the tongue fit into the interdental notches between the teeth in the socket, and the teeth in the socket fit into the interdental notches between the teeth in the tongue. The tongue and socket pivot in discrete positions, while lateral movement is prevented by the engagement of the ring and the socket. Various tongue/socket combinations can be used for coupling objects for articulating movement.

14 Claims, 7 Drawing Sheets

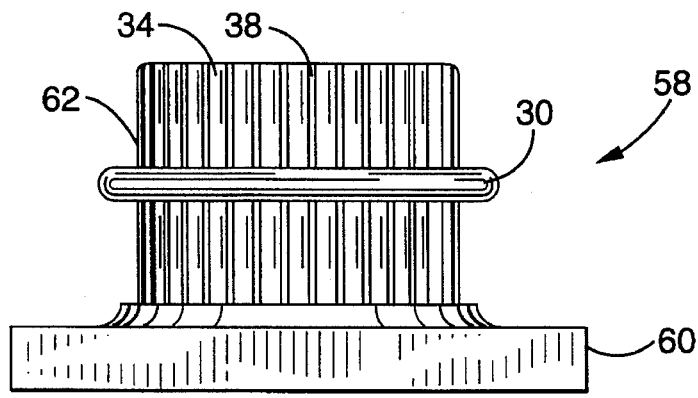
FIG. — 13
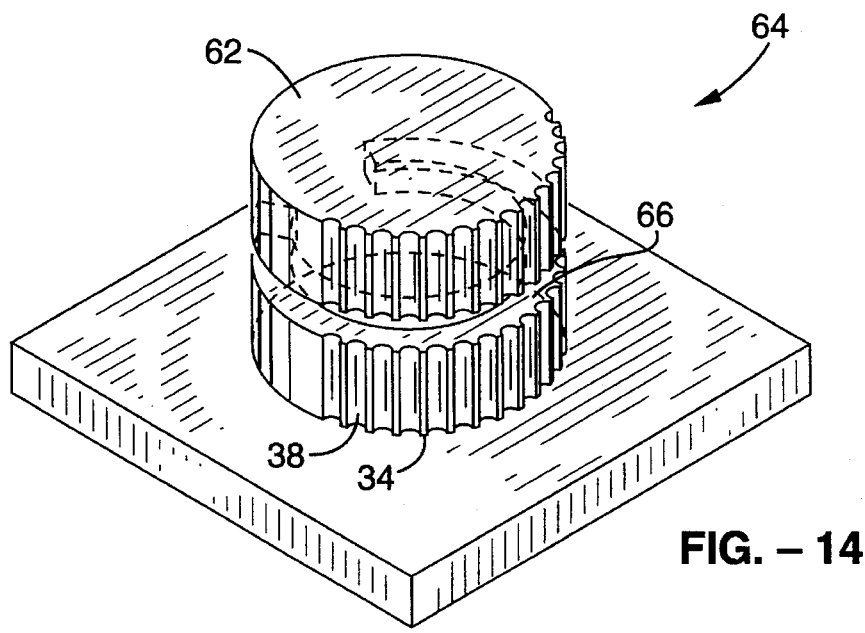
FIG. — 14
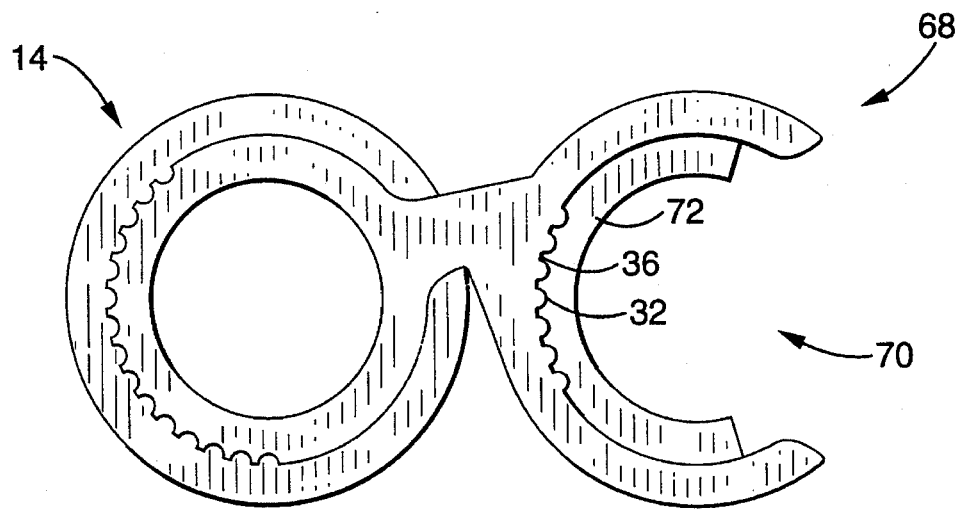
FIG. — 15

RATCHET LINK

BACKGROUND OF THE INVENTION

1. Field of the Invention

This invention pertains to coupling devices generally, and more particularly to a chainable link which, when used in an articulating assembly, provides for pivotal ratcheting of adjacent links between various positions.

2. Description of the Background Art

Pivotal coupling devices are used in many applications where two or more components are joined together in a manner that allows movement of the components in relation to each other. A common pivotal coupling device is a hinge, and a number of hinge assemblies have been previously developed. For example, U.S. Pat. No. 3,000,049 issued to Terry, Jr. on Sep. 19, 1962, discloses a plastic hinge and method of making the same having two leaves, one of which has spaced apart coaxial knuckles with integral stub pintles, and the other leaf having one knuckle with sockets in each end. The stub pintles of the one leaf have beads which correspond to depressions in the sockets of the other leaf, so that when the two leaves are fitted together, they can articulate in a ratchet fashion. U.S. Pat. No. 3,118,167 issued to Morris et al. on Jan. 21, 1964, discloses a door checking appliance having two hinge leaves, one of which has a hollow cylinder with a spindle mounted rotatably within, and the other leaf having a one way clutch device connected to the spindle. A damping fluid is contained in the annular space defined by the spindle and cylinder, and the spindle and cylinder can have grooved or serrated surfaces to provide a ratchet effect. U.S. Pat. No. 4,506,408 issued to Brown on Mar. 26, 1985, discloses a ratchet hinge structure having male and female components which mesh so that the components can lock relative to each other in various positions. The related male and female surfaces can have serrations or bumps to allow ratchet articulation.

Another common pivotal coupling device is a "link" found in the assembly known as a "chain". Such chains are used in many different types of machines to couple two or more sprockets for transmission of rotational motion. In such applications, the chain is held in a taught position under the urge of a spring or other force in order to control the degree of articulation at various points along the chain.

A number of other coupling devices have also been developed. For example, U.S. Pat. No. 5,172,534 issued to Milner et al. on Dec. 22, 1992, discloses chainable building blocks wherein a plurality of detachably chainable links pivotally attached to each other by snap fitting protrusions into indentations. Detents are provided at a plurality of pivot positions so that engaged links can be held in stable positions relative to each other. U.S. Pat. No. 5,209,693 issued to Lyman on May 11, 1993, discloses a toy block set with flexible connectors on opposing ends wherein projections on one face of building blocks can be wedged into sockets on another face of other building blocks in a manner that allows lateral pivoting of one block relative to another. U.S. Pat. No. 1,678,709 issued to Schurmann on Jul. 31, 1928, discloses a sectional or link shaft having flat link plates with forked end portions, with a generally circular opening between the forked ends of the link plates. A flat disk with transverse notches in its periphery links two shafts together by fitting forked ends into the transverse notches. U.S. Pat. No. 4,548,590 issued to Green on Oct. 22, 1985, discloses a construction element having a body with resiliently openable claws at each end. Construction elements attach to each other by claws on different elements engaging each other or by claws on one element engaging the body of another element. U.S. Pat. No. 5,049,104 issued to Olsen on Sep. 17, 1991, discloses a connecting means for a toy building set which includes a connecting system having first and second coupling parts complementary to each other. The connecting parts interconnect building elements by connecting first and second coupling parts while one coupling part is stressed and the other is relaxed. U.S. Pat. No. 4,617,001 issued to Parein on Oct. 14, 1986, discloses elements of a construction or assembly set wherein detachable links are formed by a first link having two generally spherical ends and a second link having two slots capable of receiving the spherical ends of the first link. The joined links are pivotable about the spherical links in the slots.

As can be seen therefore, a variety of coupling devices have been devised for use with doors, toy building blocks, and in connection with other applications. However, none of those devices provide for a chained assembly of articulating links capable of pivotal movement in finite, precise, clicking units, wherein lateral movement is also prevented. Therefore, there is a need for a chainable coupling device which can be quickly, easily, and accurately adjusted to a desired position, and which is capable of linking to other such devices to form extended assemblies with additional degrees of articulation. The present invention satisfies those needs, as well as others, and overcomes the deficiencies found in the coupling devices heretofore developed.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention pertains generally to links which can be used to form ratcheting chained assemblies for coupling two objects in an articulating manner. By way of example, and not of limitation, a ratchet link in accordance with the present invention has generally planar faces and includes a cylindrically-shaped tongue at one end, a C-shaped socket at the other end, and a connecting bar which extends between the tongue and the socket. The socket is defined by a pair of opposing, spaced-apart, resilient arcuate prongs which extend outward from the device away from the tongue end. The inside radius of the socket is substantially the same as the outside radius of the tongue, so that the tongue can be inserted into the socket of another link. The socket includes a narrow centrally positioned slot along its circumference, and the tongue includes a narrow centrally positioned ring extending outward along its circumference which is received by the slot when the tongue is inserted into the socket. A plurality of spaced apart teeth are provided along the inside surface of the socket and extend between the faces of the device in a substantially perpendicular orientation to the plane of the faces. Similar teeth are located along the outside surface of the tongue. When the tongue is placed into the socket of another link, the teeth intermesh wherein the teeth in the tongue fit into the interdental notches between the teeth in the socket, and the teeth in the socket fit into the interdental notches between the teeth in the tongue. Lateral movement is prevented by the engagement of the ring and the socket. Individual links are coupled by inserting the tongue of a first link into the socket of a second link with sufficient force to cause the arcuate prongs to spread apart, whereupon the tongue "pops" into the socket, the ring is inserted into the slot, and the teeth intermesh. At that point, the two devices are held in fixed relative position. Applying rotational force to each link in an opposite direction causes the arcuate prongs to spread slightly so as to overcome the intermeshing of the teeth and thereby allowing pivotal adjustment of the relative position or angle of the two links. When the rotational force is removed, the ratchet links retain the adjusted position. In alternative embodiments of the invention, each link can include a tongue at each end or a socket at each end, and the various embodiments can be combined in a chained assembly. In addition, the link can be adapted for mounting to various objects.

An object of the present invention is to provide a ratchet link that is quickly, easily, and accurately adjusted to precise incremental positions.

Another object of the present invention is to provide a ratchet link which is capable of linking to other ratchet link devices to form extended ratcheting links with additional degrees of articulation.

Another object of the present invention is to provide a ratchet link which can be used in association with equipment suspended from the head visors and head gear worn in the medical, dental, veterinary, and other professions.

Another object of the present invention is to provide a ratchet link which can be for articulating connection of toy building blocks. A chained assembly of such "ratcheting" links could be used for suspending components in a fixed position; for example, the use of eyewear or other protective equipment suspended from a visor or other head worn devices.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 13 is a side elevation view showing a post mount in accordance with the present invention.

FIG. 14 is a perspective view of an alternative embodiment of the post mount shown in FIG. 13.

FIG. 15 is a plan view of an alternative embodiment of the ratchet link shown in FIG. 2 modified for coupling to the post mount shown in FIG. 14.

DESCRIPTION OF THE PREFERRED EMBODIMENTS

Figure 1:
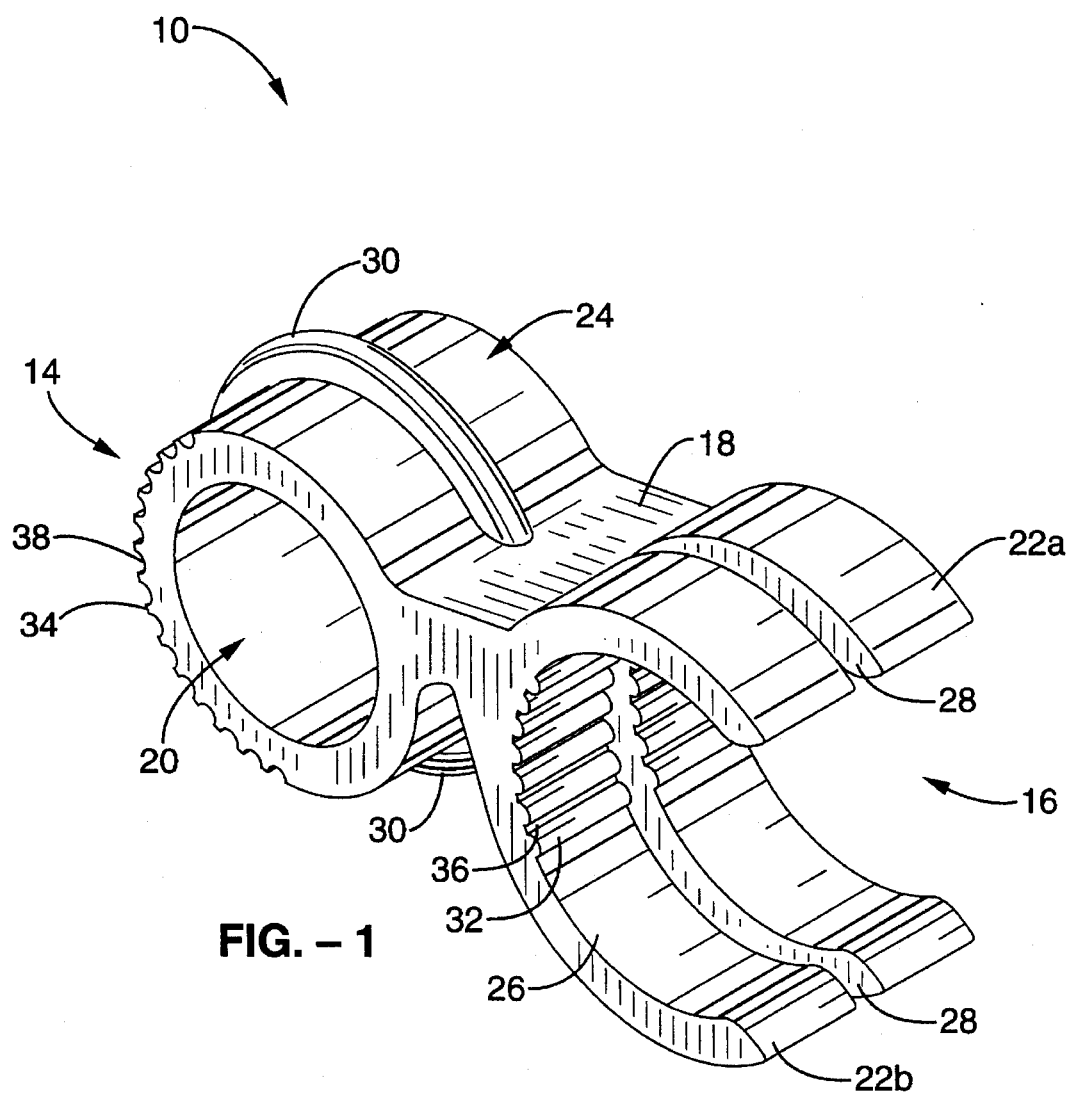
FIG. 1 is a perspective view of a ratchet link in accordance with the present invention showing a tongue positioned on one end and a socket positioned on the other end.

Referring more specifically to the drawings, for illustrative purposes the present invention is embodied in the apparatus generally shown in FIG. 1 through FIG. 7, where like reference numerals denote like parts. It will be appreciated that the apparatus may vary as to configuration and as to details of the pans without departing from the basic concepts as disclosed herein.

Figure 2:
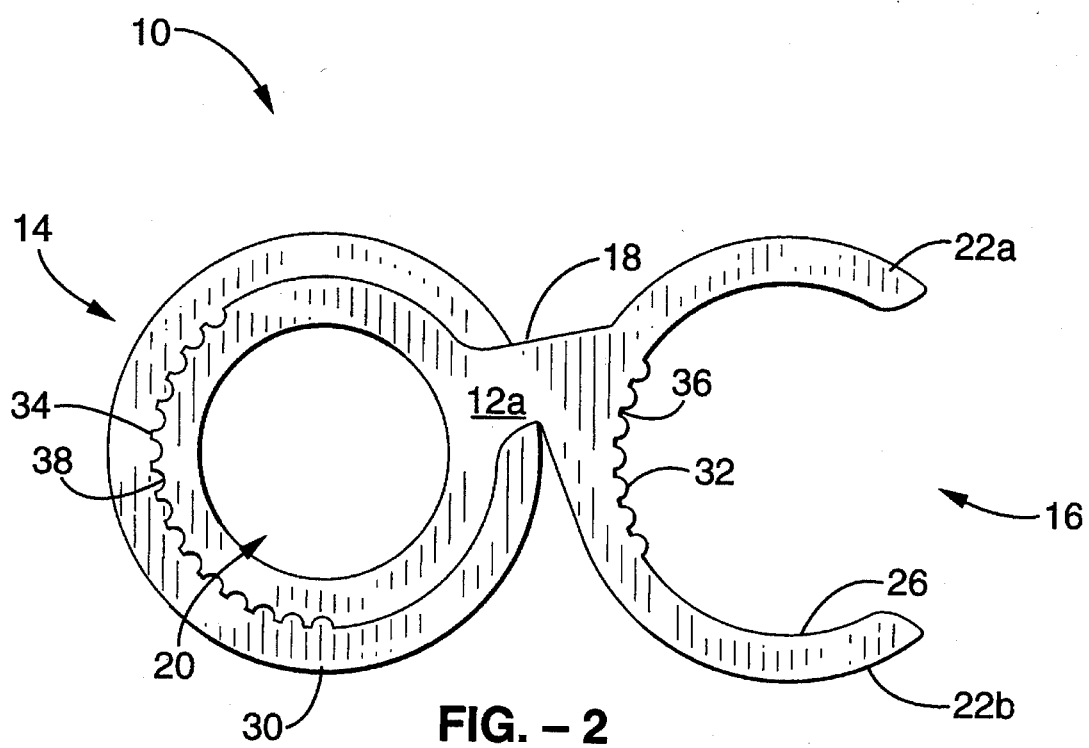
FIG. 2 is a side elevation view of the apparatus shown in FIG. 1.
Figure 3:
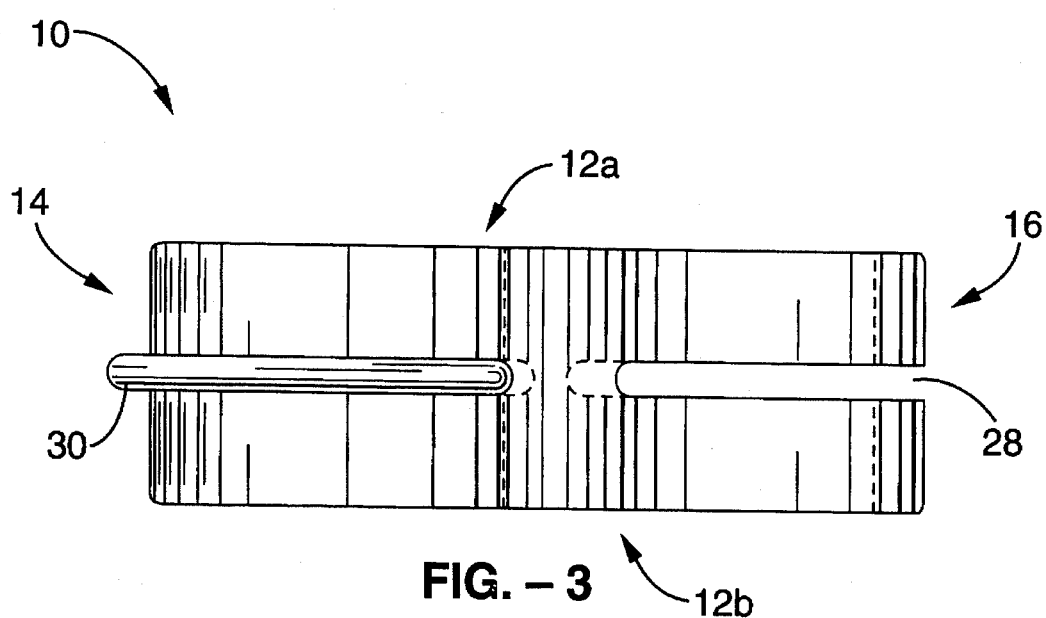
FIG. 3 is a plan view of the apparatus shown in FIG. 1.

Referring to FIG. 1 through FIG. 3, the preferred embodiment of a ratchet link 10 in accordance with the present invention is generally shown. As can be seen, the device includes generally planar faces 12a, 12b, a tongue 14, a socket 16, and a bar 18 extending between tongue 14 and socket 16. Tongue 14 is a generally annular or cylindrical-shaped member as shown, and preferably includes a central opening 20 extending between faces 12a and 12b to reduce weight. Alternatively, tongue 14 could be a solid member. Socket 16 is a generally annular or C-shaped member having a pair of opposing, spaced-apart, resilient arcuate prongs 22a, 22b which extend outward away from tongue 14. Preferably, the inside radius of socket 16 is substantially equal to the outer radius of tongue 14 so that outer surface 24 will contact inner surface 26 when tongue 14 is inserted into socket 16.

Socket 16 includes a narrow, centrally positioned annular slot 28 extending along its circumference, and tongue 14 includes a thin, centrally positioned annular ring 30 extending outward along its circumference which is received by slot 28 when tongue 14 is inserted into socket 16. A plurality of spaced-apart teeth 32 are provided along the inner surface 26 of socket 16 and extend between faces 12a, 12b of the device in a substantially perpendicular orientation to the plane of the faces. Similar teeth 34 are located along the outside surface 24 of tongue 14. When tongue 14 is placed into socket 16, the teeth intermesh wherein the teeth 34 in tongue 14 fit into the interdental notches 36 between teeth 32 in socket 16, and the teeth 32 in socket 16 fit into the interdental notches 38 between the teeth 34 in tongue 14. Preferably, the teeth are serrations or ridges as shown, but other engagement means such as bumps or protrusions, in regular or random patterns, are also contemplated.

Figure 4:
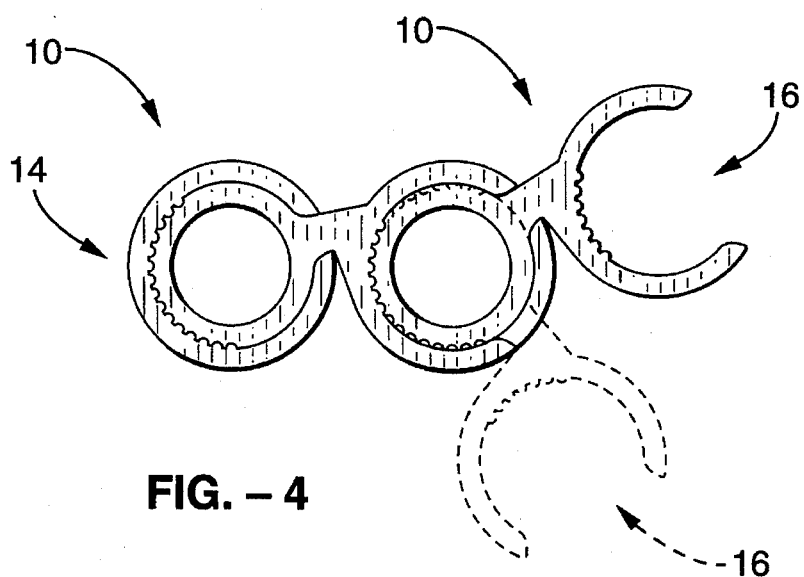
FIG. 4 is a plan view showing the apparatus shown in FIG. 1 coupled to another identical apparatus wherein the tongue of one such apparatus is inserted into the socket of the other such apparatus, and diagrammatically showing articulation of the two devices in relation to each other.

Referring also to FIG. 4, two ratchet link devices in accordance with the present invention are shown coupled to form an articulating chain. Tongue 14 of one such device is inserted into the socket 12 of a second such device. In the preferred embodiment, the apparatus is fabricated from a lightweight, resilient material such as molded plastic or non-brittle metal, so that prongs 22a, 22b will spread apart when tongue 14 is inserted into socket 16. Once tongue 14 is inserted, prongs 22a, 22b will return to their normal position thereby allowing tongue 14 to "pop" into socket 16. Prongs 22a, 22b will then hold tongue 14 in place. Note also that, as a result of ring 30 engaging slot 28, the two links are held in prevented from sliding apart as a result of lateral motion. Further, in such an assembly both a tongue 14 and socket 16 remain unattached, allowing coupling of additional devices to form a chain of such ratchet links as shown in FIG. 5.

Figure 5:
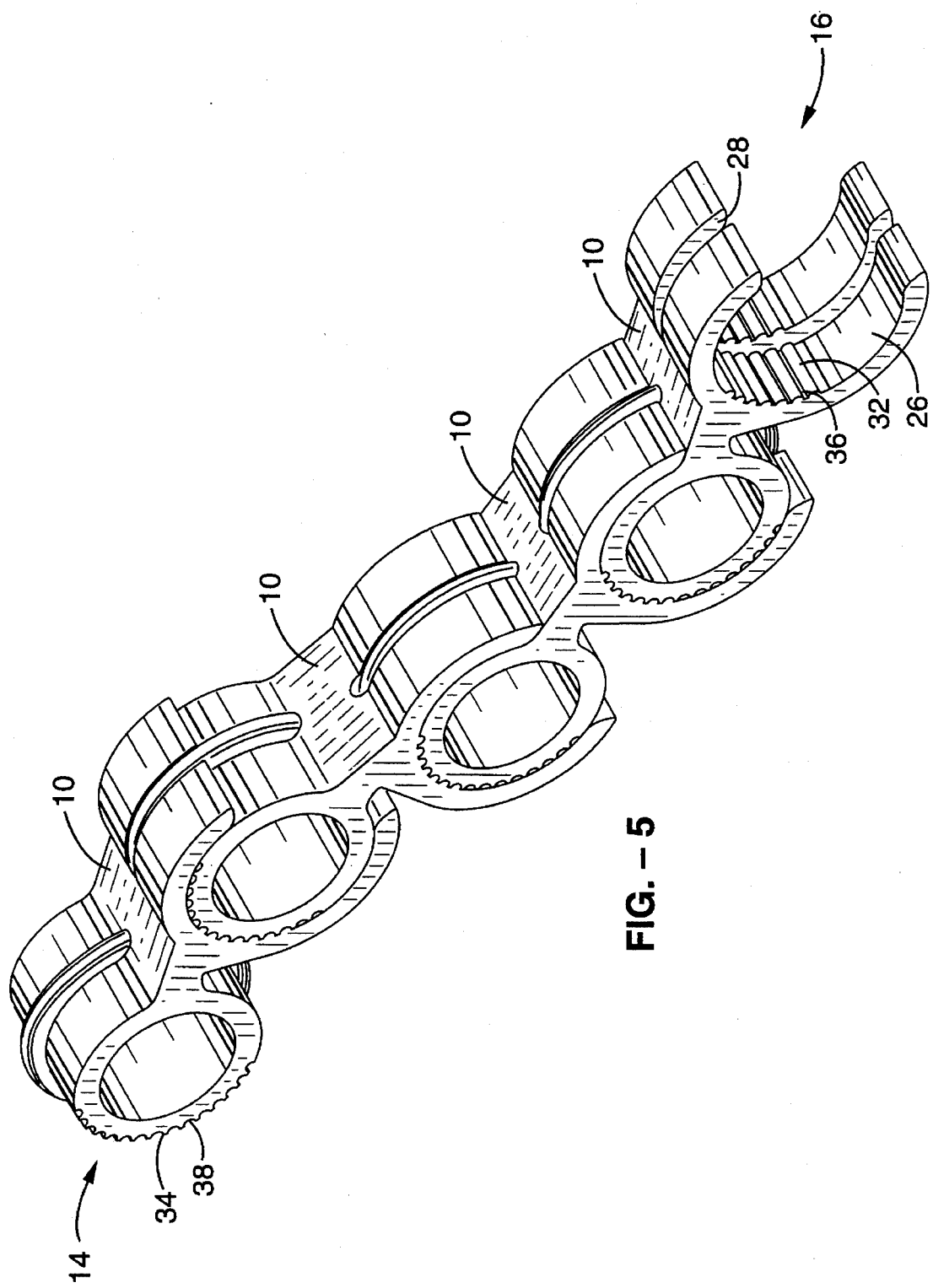
FIG. 5 is a perspective view showing several of the devices of FIG. 1 coupled in a chained configuration.

In the coupled configurations shown in FIG. 4 and FIG. 5, the teeth 32 on the inner surface 26 of socket 16 engage and interfit with the teeth 34 on outer surface 24 of tongue 14. Articulation is achieved by applying axial force in opposite directions to the free ends of wherein the teeth will disengage due to the resiliency of prongs 22a, 22b. When the force is removed, the teeth re-engage and interfit in a new position. The articulation occurs in a ratchet fashion and can be adjusted in precise incremental amounts, with the adjusted position stable until force is re-applied. The size and spacing of the teeth can be varied to change the degree of incremental precision desired in the articulation.

As can be seen in FIG. 2 and FIG. 2, tongue 14 and socket 16 are joined by connecting bar 18 in an axially aligned configuration which forms planar faces 12a, 12b. Those skilled in the art will appreciate that, by joining tongue 14 and socket 16 with angular offsets, such as at a right angle, an additional degree of spatial adjustment is possible. By combining links which are axially aligned with other links where the tongue and socket are positioned at an angle in relation to each other, both vertical and horizontal articulation could be achieved. Note also from FIG. 2, that the longitudinal axis through connecting bar 18 is angularly offset in relation to the central longitudinal axis extending between each end of the device. Such an offset limits the degree of rotation of coupled links in one direction since prongs 22a, 22b will eventually abut connecting bar 18. By changing the offset angle, the amount of travel in a particular direction can be predetermined. Alternatively, connecting bar 18 could be axially aligned with the central longitudinal axis so as to permit an equal range of travel in each direction.

Figure 6:
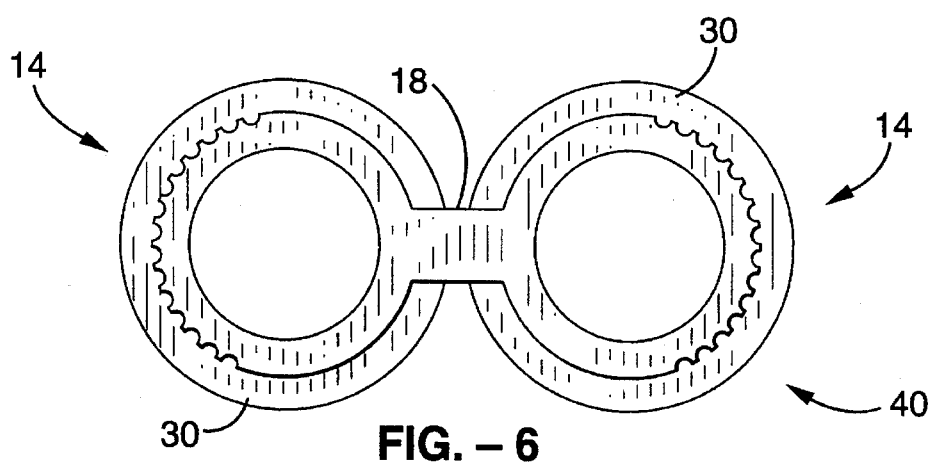
FIG. 6 is a plan view of an alternative embodiment of the apparatus shown in FIG. 1, in which a tongue is positioned on each end.
Figure 7:
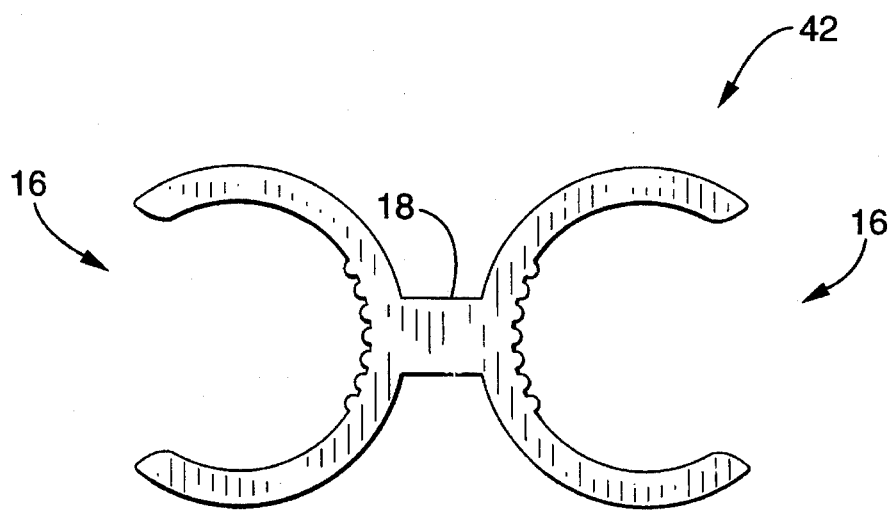
FIG. 7 is a plan view of an alternative embodiment of the apparatus shown in FIG. 1, in which a socket is positioned on each end.

Referring to FIG. 6 and FIG. 7, alternative embodiments of the apparatus are shown, where like reference numerals denote like parts. A double-tongue link 40 is shown in FIG. 6 wherein there is a tongue 14 on each end joined by connecting bar 18. In FIG. 7, there is shown a double-socket link 42 wherein there is a socket 16 on each end joined by connecting bar 18. These embodiments are identical to the embodiment of FIG. 1 through FIG. in all other respects.

Figure 8:
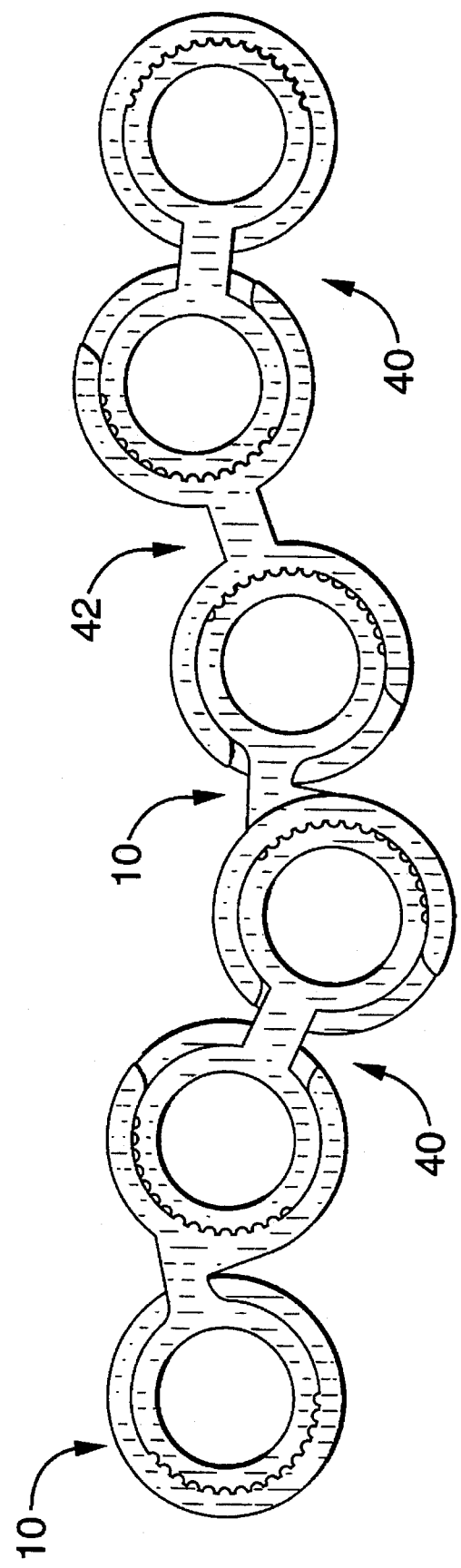
FIG. 8 is a plan view showing a chain fashioned by successive linking of the following devices of the present invention: a device of FIG. 1, a device of FIG. 6, a device of FIG. 1, a device of FIG. 7 and a device of FIG. 6.

As can be seen in FIG. 8, the various embodiments shown in FIG. 1, FIG. 6 and FIG. 7 can be interlinked if desired to provide varying degrees of articulation and attachability. FIG. 8 shows a chain fashioned by successive linking of the following devices of the present invention as seen from left to right: a device of FIG. 1, a device of FIG. 6, a device of FIG. 1, a device of FIG. 7 and a device of FIG. 6. Note also that, if a tongue 14 or socket 16 is desired a particular point in a chain of ratchet link devices, such an arrangement can be achieved by use of the proper combination of the various embodiments shown.

Figure 9:
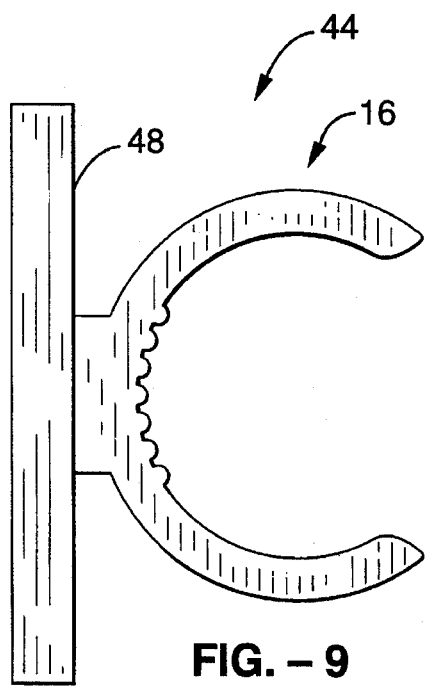
FIG. 9 is a plan view showing a tongue hook in accordance with the present invention.
Figure 10:
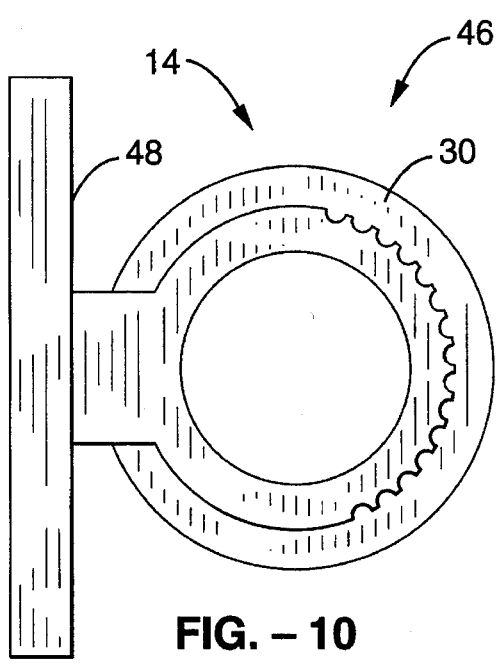
FIG. 10 is a plan view showing a socket hook in accordance with the present invention.
Figure 11:
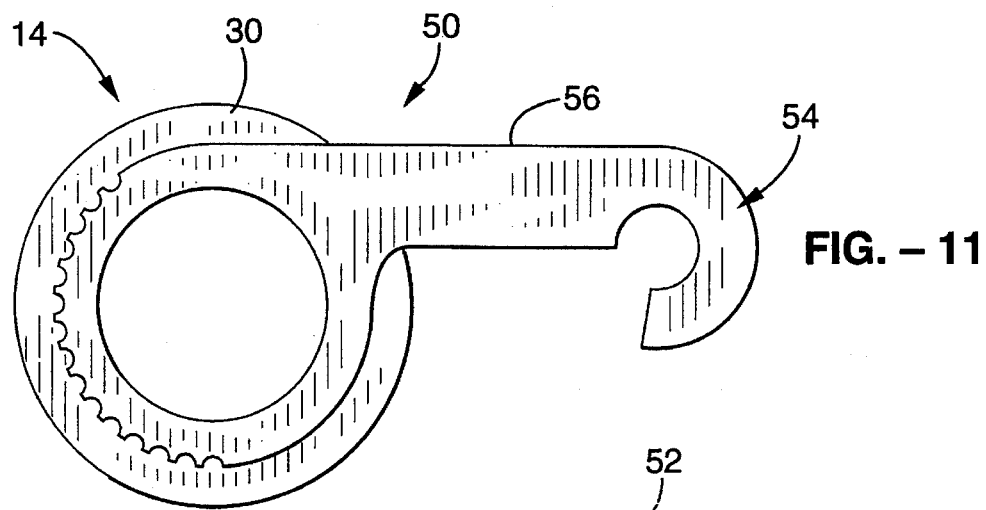
FIG. 11 is a plan view showing a socket mount in accordance with the present invention.
Figure 12:
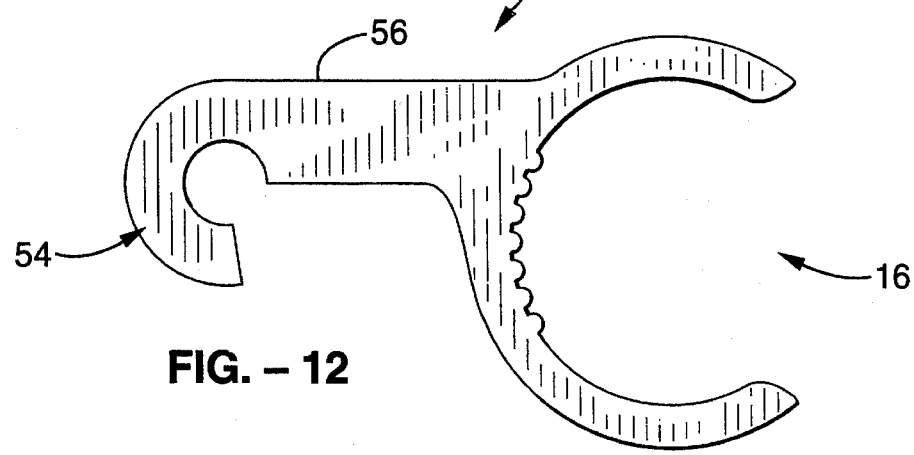
FIG. 12 is a plan view showing a tongue mount in accordance with the present invention.

Referring to FIG. 9 through FIG. 15, the present invention can be adapted for coupling various items and holding them in selected articulated positions. For example, a socket mount 44 as shown in FIG. 9 could be attached to a wall, shelf, head worn visor, or other support, and a tongue mount 46 as shown in FIG. 10 could be attached to an object to be supported thereby. Socket mount 44 includes a socket 16 at one end joined to a mounting base 48 at the other end. Mounting base 48 can in turn be attached to a support using any conventional fastening means such as nails, screws or adhesives. Tongue mount 46 can then be attached to the object to be supported. Tongue mount 46 is identical to socket mount 44 except that it includes a tongue 14 on one end. Those skilled in the art will appreciate that two socket mounts or two tongue mounts could be used by selecting the appropriate combination of alternative link configurations shown in FIG. 1, FIG. 6 and FIG. 7. In FIG. 11 and FIG. 12, there are shown a tongue hook mount 50 and a socket hook 52, respectively. A hook 54 is joined to either a tongue 14 or a socket 16 by a connecting bar 56. In this way, tongue hook 50 or socket hook 52 could be coupled to a socket mount 44 or tongue mount 46, respectively, as well as various combinations of the links shown in FIG. 1, FIG. 6 and FIG. 7 to support an object in a variety of positions with adjustability. Referring to FIG. 13, a post mount 58 is shown. Post mount 58 includes a mounting base 60 which can be attached to a support using a conventional fastening means. A cylindrical post 62 having a plurality of teeth 34, notches 38 and ring 30 as are found in a tongue 14 extends outward from mounting base 60. In this way, a socket 16 can be coupled to post mount 58 to provide for rotation about a central axis extending perpendicular to mounting base 60. Those skilled in the art will appreciate that post mount 60 could also include one or more stop means to prevent the amount of rotation in a particular direction.

Referring to FIG. 14 an alternative embodiment of post mount 58 is shown. Here, post mount 64 includes teeth 34 and notches 38 as before but, instead of a ring 30, post mount 64 includes a slot 66. Referring to FIG. 15, a link 68 is shown which is similar to a link 10, except that socket 16 includes a centrally positioned annular ring 72 extending along inner surface 26. Link 68 is provided for coupling to post mount 64 and, when coupled, ring 72 fits into slot 66.

As can be seen, therefore, the present invention provides for the degree of articulation or angle of movement to be controlled easily and accurately by employing a ratchet mechanism wherein generally the link has portions sharing frictionally related surfaces which contain a plurality of serrations, ridges, bumps, or other traction generating means as in the present invention. In using the ratchet mechanism, a force is applied to the link to overcome the friction between the shared surfaces so that a certain desired position, angle, or spatial arrangement can be obtained. Once the articulating link has been adjusted to the desired position, the force is removed and the friction between the shared surfaces of the link portions retains the desired position and prevents further unwanted articulation.

One particular application of articulating links which requires facile and accurate adjustment of the links involves the head visors and head gear used in the various work occupations. The head gear worn in the medical, dental, and veterinary professions typically have face shields, protective glasses, magnifying optics, lights, reflectors, and the like suspended therefrom. Face protection in these professions has increasingly important with the spread of AIDS. In machine shop, laboratory, and welding applications, face shields, darkened glass, and other protection means are suspended from headgear worn by workers. Similarly, bicyclists and motorcyclists attach rear-view mirrors to helmets.

This suspended equipment is generally attached to the wearer's head gear by an articulating link so the wearer can adjust the position of the suspended equipment.

In many situations, however, the protection means or other equipment suspended from the head gear cannot readily be adjusted or otherwise moved into more desirable positions because the wearer's hands are otherwise engaged. Particularly, persons in the aforementioned professions and activities are frequently involved in work requiring use of head gear with equipment suspended therefrom, while at the same time both hands are fully occupied in complex, difficult, or dangerous procedures and cannot be freed to adjust or reposition the suspended equipment. Thus, there is a need in these professions for an articulating link capable of quick, facile, and accurate adjustment, so that continued readjustment by the wearer is not necessary. The present invention satisfies this need, as well as others, by providing both the head gear and the equipment to be suspended with suitable attachment means to couple with the ratchet links. For example, referring to FIG. 9, a socket mount 44 could be attached to a head worn visor and, referring to FIG. 10, a tongue mount 46 could be attached to a face shield or eyeglasses. The two objects can be coupled in an articulating manner using a plurality of links between socket mount 44 and tongue mount 46, with the links chosen according to the distance from the head visor and degree of articulation desired for the face shield.

Another application of ratchet links in accordance with the present invention is for use with toy building blocks and building sets, such as LEGO® and the like. Toy building blocks and building sets are frequently used to create small (toy) buildings, ships, automobiles, and other structures. Ratchet links in accordance with the present invention could be attached to the building blocks at the projections, indentations, or other surface features on the building blocks to allow moving pans in the structures assembled from the building blocks, such as doors, windows, and the like, to be articulated in a plurality of positions.

Accordingly, it will be seen that this invention provides a ratchet link which provides for quick, easy, and accurate articulating attachment of objects. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A ratchet link, comprising:
   (a) a socket, said socket including a pair of opposing, spaced-apart, arcuate prongs, said prongs having ends, said socket including an inner surface between said ends of said prongs;
   (b) a generally cylindrical tongue, said tongue joined to and extending away from said socket, said tongue including an outer surface; and
   (c) link coupling means for pivotally and releasably coupling said tongue to a socket on another said ratchet link and articulating said coupled ratchet links in a plurality of discrete positions, said link coupling means comprising:
      (i) a first plurality of teeth extending outward from said inner surface of said socket and separated by a first plurality of notches; and
      (ii) a second plurality of teeth extending outward from said outer surface of said tongue and separated by a second plurality of notches.

2. A ratchet link as recited in claim 1, wherein said link coupling means further comprises:
   (a) a slot, said slot positioned circumferentially along said inner surface of said socket between said ends of said prongs; and
   (b) an annular ring, said ring positioned circumferentially along said outer surface of said tongue.

3. A ratchet link as recited in claim 2, wherein said tongue and said socket have parallel faces, and wherein said first and second plurality of teeth extend between said parallel faces.

4. A ratchet link as recited in claim 3, wherein said tongue includes a coaxial opening extending between said faces.

5. A ratchet link, comprising:
   (a) a socket, said socket including a pair of opposing, spaced-apart, resilient arcuate prongs, said prongs having ends, said socket having an inner surface between said ends of said prongs;
   (b) a slot, said slot positioned circumferentially along said inner surface of said socket between said ends of said prongs;
   (c) a first plurality of teeth extending outward from said inner surface of said socket and separated by a first plurality of notches;
   (d) a generally cylindrical tongue, said tongue joined to and extending away from said socket, said tongue having an outer surface;
   (e) an annular ring, said ring positioned circumferentially along said outer surface of said tongue; and
   (f) a second plurality of teeth extending outward from said outer surface of said tongue and separated by a second plurality of notches.

6. A ratchet link as recited in claim 5, wherein said tongue is configured and structured to pivotally and releasably engage a socket on another said ratchet link, wherein said slot of another said ratchet link receives said ring of said tongue and wherein said teeth and notches in said tongue intermesh with said teeth and notches in said socket of said other ratchet link.

7. A ratchet link as recited in claim 5, wherein said tongue and said socket have parallel faces, and wherein said first and second plurality of teeth extend between said parallel faces.

8. A ratchet link as recited in claim 5, wherein said tongue includes first and second faces, and wherein said tongue includes a coaxial opening extending between said faces.

9. An articulating coupling system, comprising:
   (a) a socket, said socket including a pair of opposing, spaced-apart, resilient arcuate prongs, said prongs having ends, said socket having an inner surface between said ends of said prongs, said socket including a slot positioned circumferentially along said inner surface of said socket between said ends of said prongs, said socket including a plurality of teeth extending outward from said inner surface of said socket and separated by a first plurality of notches;
   (b) a generally cylindrical tongue, said tongue having an outer surface, said tongue including an annular ring positioned circumferentially along said outer surface of said tongue, said tongue including a plurality of teeth extending outward from said outer surface of said tongue and separated by a second plurality of notches;
   (c) means for coupling said socket to an object; and
   (d) means for coupling said tongue to an object.

10. An articulating coupling system as recited in claim 9, further comprising a ratchet link, said ratchet link comprising:

(a) a ratchet link socket, said ratchet link socket including a pair of opposing spaced-apart, resilient arcuate prongs, said prongs having ends, said ratchet link socket having an inner surface between said ends of said prongs, said ratchet link socket including a slot positioned circumferentially along said inner surface of said ratchet link socket between said ends of said prongs, said ratchet link socket including a plurality of teeth extending outward from said inner surface of said ratchet link socket and separated by a plurality of notches, said ratchet link socket structured and configured to reversibly engage said tongue; and (b) a generally cylindrical ratchet link tongue joined to and extending away from said ratchet link socket, said ratchet link tongue having an outer surface, said ratchet link tongue including an annular ring, said ring positioned circumferentially along said outer surface of said ratchet link tongue, said ratchet link tongue including a plurality of teeth extending outward from said outer surface of said ratchet link tongue and separated by a plurality of notches, said ratchet link tongue structured and configured to reversibly engage said socket.

11. An articulating coupling system, comprising:

(a) a first socket, said first socket including a pair of opposing, spaced-apart, resilient arcuate prongs, said prongs having ends, said first socket having an inner surface between said ends of said prongs, said first socket including a slot positioned circumferentially along said inner surface of said first socket between said ends of said prongs, said first socket including a plurality of teeth extending outward from said inner surface of said first socket and separated by a first plurality of notches;

(b) means for coupling said first socket to an object;

(c) a second socket, said second socket including a pair of opposing, spaced-apart, resilient arcuate prongs, said prongs having ends, said second socket having an inner surface between said ends of said prongs, said second socket including a slot positioned circumferentially along said inner surface of said second socket between said ends of said prongs, said second socket including a plurality of teeth extending outward from said inner surface of said second socket and separated by a first plurality of notches;

(d) means for coupling said second socket to an object;

(e) a first link, said first link including a pair of sockets, each said socket including a pair of opposing spaced-apart, resilient arcuate prongs, said prongs having ends, each said socket having an inner surface between said ends of said prongs, each said socket including a slot positioned circumferentially along said inner surface of said socket between said ends of said prongs, each said socket including a plurality of teeth extending outward from said inner surface of said socket and separated by a plurality of notches; and (f) a second link, said second link including a pair of generally cylindrical tongues, each said tongue having an outer surface, each said tongue including an annular ring, said ring positioned circumferentially along said outer surface of said tongue, each said tongue including a plurality of teeth extending outward from said outer surface of said tongue and separated by a plurality of notches, each said tongue structured and configured to reversibly engage said first socket and said second socket, each said tongue structured and configured to reversibly engage each of said pair of sockets on said first link.

12. An articulating coupling system as recited in claim 11, further comprising:

(a) a third link, said third link including a socket, said socket including a pair of opposing spaced-apart, resilient arcuate prongs, said prongs having ends, said socket having an inner surface between said ends of said prongs, said socket including a slot positioned circumferentially along said inner surface of said socket between said ends of said prongs, said socket including a plurality of teeth extending outward from said inner surface of said socket and separated by a plurality of notches, said socket structured and configured to reversibly engage each of said pair of tongues on said second link; and (b) a generally cylindrical tongue joined to and extending away from said socket, said tongue having an outer surface, said tongue including an annular ring, said ring positioned circumferentially along said outer surface of said tongue, said tongue including a plurality of teeth extending outward from said outer surface of said tongue and separated by a plurality of notches, said tongue structured and configured to reversibly engage said first socket and said second socket, said tongue structured and configured to reversibly engage each of said pair of sockets on said second link.

13. An articulating coupling system, comprising:

(a) a first generally cylindrical tongue, said first tongue having an outer surface, said first tongue including an annular ring positioned circumferentially along said outer surface of said first tongue, said first tongue including a plurality of teeth extending outward from said outer surface of said first tongue and separated by a plurality of notches;

(b) means for coupling said first tongue to an object;

(c) a second generally cylindrical tongue, said second tongue having an outer surface, said second tongue including an annular ring positioned circumferentially along said outer surface of said second tongue, said second tongue including a plurality of teeth extending outward from said outer surface of said second tongue and separated by a plurality of notches;

(d) means for coupling said second tongue to an object;

(e) a first link, said first link including a pair of sockets, each said socket including a pair of opposing spaced-apart, resilient arcuate prongs, said prongs having ends, each said socket having an inner surface between said ends of said prongs, each said socket including a slot positioned circumferentially along said inner surface of said socket between said ends of said prongs, each said socket including a plurality of teeth extending outward from said inner surface of said socket and separated by a plurality of notches, each said socket structured and configured to reversibly engage said first tongue and said second tongue; and (f) a second link, said second link including a pair of generally cylindrical tongues, each said tongue having an outer surface, each said tongue including an annular ring, said ring positioned circumferentially along said outer surface of said tongue, each said tongue including a plurality of teeth extending outward from said outer surface of said tongue and separated by a plurality of notches, each said tongue structured and configured to reversibly engage each of said sockets on said first link.

14. An articulating coupling system as recited in claim 13, further comprising:

(a) a third link, said third link including a socket, said socket including a pair of opposing spaced-apart, resilient arcuate prongs, said prongs having ends, said socket having an inner surface between said ends of said prongs, said socket including a slot positioned circumferentially along said inner surface of said socket between said ends of said prongs, said socket including a plurality of teeth extending outward from said inner surface of said socket and separated by a plurality of notches, said socket structured and configured to reversibly engage said first tongue and said second tongue, said socket structured and configured to reversibly engage each of said pair of tongues on said second link; and (b) a generally cylindrical tongue joined to and extending away from said socket, said tongue having an outer surface, said tongue including an annular ring, said ring positioned circumferentially along said outer surface of said tongue, said tongue including a plurality of teeth extending outward from said outer surface of said tongue and separated by a plurality of notches., said tongue, structured and configured to reversibly engage each of said pair of sockets on said first link.

* * * * *